United States Patent
McGowan et al.

(10) Patent No.: US 12,147,074 B2
(45) Date of Patent: Nov. 19, 2024

(54) THERMO-OPTIC PHASE SHIFTERS

(71) Applicant: GlobalFoundries U.S. Inc., Malta, NY (US)

(72) Inventors: Brian McGowan, Waterbury, VT (US); Ping-Chuan Wang, Hopewell Junction, NY (US); Oscar Restrepo, Halfmoon, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 261 days.

(21) Appl. No.: 17/953,804

(22) Filed: Sep. 27, 2022

(65) Prior Publication Data
US 2024/0103217 A1 Mar. 28, 2024

(51) Int. Cl.
*G02B 6/122* (2006.01)
*G02B 6/12* (2006.01)

(52) U.S. Cl.
CPC ......... *G02B 6/122* (2013.01); *G02B 6/12028* (2013.01); *G02B 2006/12142* (2013.01)

(58) Field of Classification Search
None
See application file for complete search history.

(56) References Cited

U.S. PATENT DOCUMENTS

| | | | |
|---|---|---|---|
| 10,908,438 B1 * | 2/2021 | Wood | G02F 1/0081 |
| 10,942,321 B1 * | 3/2021 | Chandran | G02B 6/4215 |
| 2004/0171249 A1 * | 9/2004 | Ahn | H01L 23/66 |
| | | | 438/637 |
| 2010/0099242 A1 * | 4/2010 | Fedeli | G02B 6/1347 |
| | | | 438/513 |
| 2011/0037133 A1 * | 2/2011 | Su | H01L 31/1808 |
| | | | 257/E31.127 |
| 2012/0280345 A1 * | 11/2012 | Zhu | G02B 6/1226 |
| | | | 257/E31.127 |
| 2015/0016769 A1 * | 1/2015 | Verma | G02B 6/12004 |
| | | | 438/69 |
| 2015/0212386 A1 * | 7/2015 | Patel | G02F 1/2257 |
| | | | 385/3 |
| 2016/0291350 A1 * | 10/2016 | Fujikata | G02F 1/025 |
| 2021/0018690 A1 * | 1/2021 | Bian | G02B 6/124 |

(Continued)

OTHER PUBLICATIONS

S. Zhu et al., "An Improved Thermo-Optic Phase Shifter with AlN Block for Silicon Photonics," 2019 Optical Fiber Communications Conference and Exhibition (OFC), 2019, pp. 1-3.

(Continued)

*Primary Examiner* — Jerry Rahll
(74) *Attorney, Agent, or Firm* — Thompson Hine LLP; Anthony Canale

(57) ABSTRACT

Structures for a thermo-optic phase shifter and methods of forming such structures. The structure comprises a waveguide structure including a waveguide core. The structure further comprises a silicide layer, a first dielectric layer arranged in a lateral direction between the silicide layer and the waveguide core, and a second dielectric layer positioned over the waveguide core, the silicide layer, and the first dielectric layer. The first dielectric layer comprises a first material having a first thermal conductivity, and the second dielectric layer comprises a second material having a second thermal conductivity that is less than the first thermal conductivity.

20 Claims, 3 Drawing Sheets

(56) References Cited

U.S. PATENT DOCUMENTS

2021/0063655 A1*  3/2021  Chandran .......... G02B 6/29338
2023/0003937 A1*  1/2023  Rakowski ............. G02F 1/0147
2024/0045142 A1*  2/2024  Bian ...................... G02B 6/126

OTHER PUBLICATIONS

Nicholas C. Harris, Yangjin Ma, Jacob Mower, Tom Baehr-Jones, Dirk Englund, Michael Hochberg, and Christophe Galland, "Efficient, compact and low loss thermo-optic phase shifter in silicon," Optics Express 22, 10487-10493 (2014).

A. Masood et al., "Comparison of heater architectures for thermal control of silicon photonic circuits," 10th International Conference on Group IV Photonics, 2013, pp. 83-84, doi: 10.1109/Group4.2013.6644437.

Alemany, Rubén, et al. "Thermo-Optic Phase Tuners Analysis and Design for Process Modules on a Silicon Nitride Platform." Photonics. vol. 8. No. 11. Multidisciplinary Digital Publishing Institute, 2021.

* cited by examiner

THERMO-OPTIC PHASE SHIFTERS

BACKGROUND

The disclosure relates to photonics chips and, more specifically, to structures for a thermo-optic phase shifter and methods of forming such structures.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

A thermo-optic phase shifter can be used to modulate the phase of light propagating in a waveguide core. Heat is generated by a heater and transferred from the heater to the waveguide core, which has a refractive index that varies with temperature. However, heat that is generated by the heater but not transported to the waveguide core is wasted. The inability to efficiently transport heat from the heater to the waveguide core may limit the performance and reliability of a thermo-optic phase shifter.

Improved structures for a thermo-optic phase shifter and methods of forming such structures are needed.

SUMMARY

In an embodiment of the invention, a structure comprises a waveguide structure including a waveguide core. The structure further comprises a silicide layer, a first dielectric layer arranged in a lateral direction between the silicide layer and the waveguide core, and a second dielectric layer positioned over the waveguide core, the silicide layer, and the first dielectric layer. The first dielectric layer comprises a first material having a first thermal conductivity, and the second dielectric layer comprises a second material having a second thermal conductivity that is less than the first thermal conductivity.

In an embodiment of the invention, a method comprises forming a waveguide structure including a waveguide core, forming a silicide layer, forming a first dielectric layer arranged in a lateral direction between the silicide layer and the waveguide core, and forming a second dielectric layer positioned over the waveguide core, the silicide layer, and the first dielectric layer. The first dielectric layer comprises a first material having a first thermal conductivity, and the second dielectric layer comprises a second material having a second thermal conductivity that is less than the first thermal conductivity.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
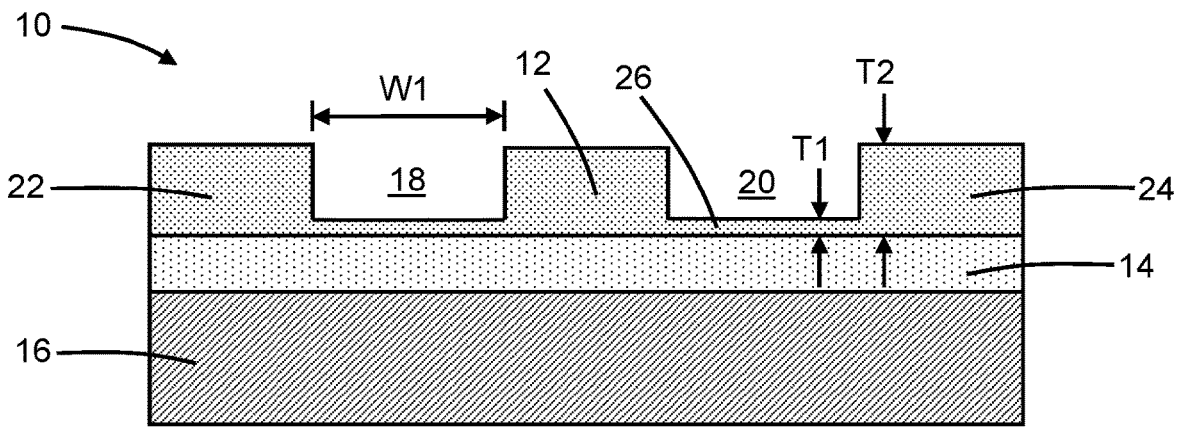
FIG. 1 is a cross-sectional view of a structure at an initial fabrication stage of a processing method in accordance with embodiments of the invention.

With reference to FIG. 1 and in accordance with embodiments of the invention, a structure 10 for a thermo-optic phase shifter includes a waveguide core 12 that is positioned over a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may fully separate the waveguide core 12 from the substrate 16. In an alternative embodiment, one or more additional dielectric layers comprised of, for example, silicon dioxide may be positioned between the waveguide core 12 and the dielectric layer 14.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon or polysilicon. In an embodiment, the waveguide core 12 may be comprised of a material having a refractive index that varies as a function of temperature. In an embodiment, the waveguide core 12 may be comprised of a material having a refractive index that is greater than the refractive index of silicon dioxide and having a refractive index that varies as a function of temperature.

In an embodiment, the waveguide core 12 may be formed by patterning a layer comprised of the constituent material with lithography and etching processes. In an embodiment, an etch mask may be formed by a lithography process over a layer, and unmasked sections of the layer may be etched by an etching process. The shape of the etch mask determines the patterned shape of the waveguide core 12. In an embodiment, the waveguide core 12 may be formed by patterning the semiconductor material (e.g., single-crystal silicon) of a device layer of a silicon-on-insulator substrate. In an embodiment, the waveguide core 12 may be formed by depositing a layer comprised of the constituent material (e.g., polysilicon) and patterning the deposited layer.

In an embodiment, the etched layer may include trenches 18, 20 that are positioned adjacent to the waveguide core 12 and strips 22, 24 adjacent to the trenches 18, 20 that are masked during the etching process. In an embodiment, the strips 22, 24 may be symmetrically arranged relative to the waveguide core 12. The trench 18 may have a width dimension W1 measured across the trench 18 from the waveguide core 12 to the strip 22. In an embodiment, the trench 20 may also have the width dimension W1 measured across the trench 20 from the waveguide core 12 to the strip 24.

In an embodiment, a slab layer 26 may be located at the bottom of the trenches 18, 20. The slab layer 26 is formed by partially etching through the layer of material that is patterned to form the waveguide core 12. The slab layer 26 connects a lower portion of the waveguide core 12 to a lower portion of the strip 22 and a lower portion of the strip 24. The slab layer 26 has a thickness T1 that is less than the thickness T2 of the waveguide core 12 and the strips 22, 24. The waveguide core 12 and the slab layer 26 collectively define a rib waveguide. In an alternative embodiment, the trenches 18, 20 may extend fully to the dielectric layer 14 such that the slab layer 26 is absent and the strips 22, 24 are disconnected from the waveguide core 12.

Figure 2:
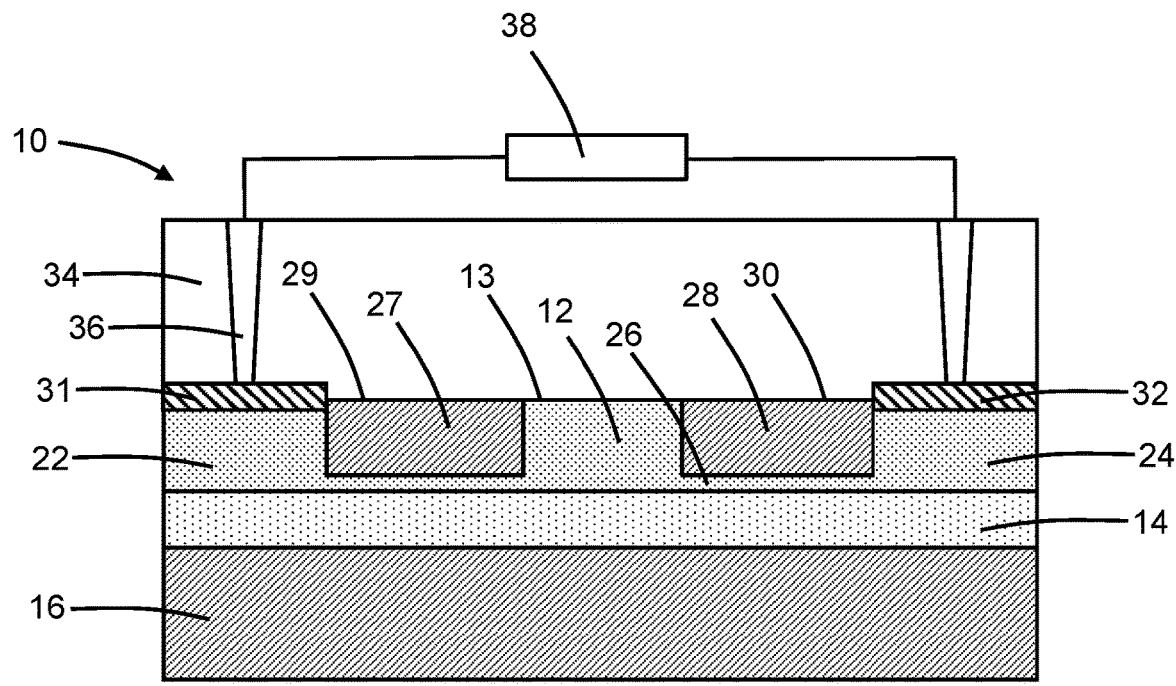
FIG. 2 is a cross-sectional view of the structure at a fabrication stage of the processing method subsequent to FIG. 1.

With reference to FIG. 2 in which like reference numerals refer to like features in FIG. 1 and at a subsequent fabrication stage, a dielectric layer 27 is formed inside the trench 18 (FIG. 1), and a dielectric layer 28 is formed inside the trench 20 (FIG. 1). In an embodiment, the dielectric layers 27, 28 may have respective top surfaces 29, 30 that are coplanar with a top surface 13 of the waveguide core 12. In an alternative embodiment, the top surface 29 of the dielectric layer 27 and the top surface 30 of the dielectric layer 28 may project above the top surface 13 of the waveguide core 12. In an embodiment, the dielectric layers 27, 28 may be deposited and then planarized by chemical-mechanical polishing. The waveguide core 12 is positioned in a lateral direction between the dielectric layer 27 in the trench 18 and the dielectric layer 28 in the trench 20. In an embodiment, the dielectric layers 27, 28 may have a width dimension equal to the width dimension W1 of the trenches 18, 20. The slab layer 26, if present, is positioned in a vertical direction between the dielectric layers 27, 28 and the dielectric layer 14.

Silicide layers 31, 32 may be respectively formed as stripes on the strips 22, 24. The silicide layers 31, 32 may be formed by a silicidation process that involves one or more annealing steps to form a silicide phase by reacting the semiconductor material of the strips 22, 24 with a layer comprised of a silicide-forming metal, such as nickel, that is formed on the strips 22, 24. An initial annealing step of the silicidation process may consume all or part of the silicide-forming metal to form the silicide layers 31, 32. Following the initial annealing step, any non-reacted silicide-forming metal may be removed by wet chemical etching. The silicide layers 31, 32 may then be subjected to an additional annealing step at a higher temperature to form a lower-resistance silicide phase.

The silicide layer 31 on the strip 22 may define a heater, and the silicide layer 32 on the strip 22 may define another heater. In an embodiment, the silicide layer 31 may abut a portion of the dielectric layer 27 in a directly contacting arrangement, and the silicide layer 32 may abut a portion of the dielectric layer 28 in a directly contacting arrangement. In an embodiment, each of the dielectric layers 27, 28 may abut the waveguide core 12 in a directly contacting arrangement. In an embodiment, the silicide layer 31 may abut a portion of the dielectric layer 27 and the dielectric layer 27 may abut the waveguide core 12, and the silicide layer 32 may abut a portion of the dielectric layer 28 and the dielectric layer 28 may abut the waveguide core 12.

A dielectric layer 34 is positioned over the waveguide core 12, the dielectric layers 27, 28, and the silicide layers 31, 32. The dielectric layer 34 may be comprised of a dielectric material, such as silicon dioxide, that is deposited and then planarized following deposition. The dielectric material constituting the dielectric layer 34 may have a refractive index that is less than the refractive index of the material constituting the waveguide core 12. The dielectric layers 27, 28 are formed and therefore present inside the trenches 18, 20 before depositing the dielectric layer 34.

Contacts 36 are formed in the dielectric layer 34, and the contacts 36 are physically and electrically connected to the silicide layers 31, 32. The contacts 36 may be comprised of a metal, such as tungsten, that is deposited in openings patterned in the dielectric layer 34. The contacts 36 may connect the silicide layers 31, 32 with a power source 38 that can be operated to supply a current that causes Joule heating of the silicide layers 31, 32 such that the silicide layers 31, 32 can generate heat that is transferred to the waveguide core 12.

The dielectric layers 27, 28 are comprised of a material characterized by a thermal conductivity, and the dielectric layer 34 is comprised of a material characterized by a thermal conductivity that is less than the thermal conductivity of the material of the dielectric layers 27, 28. In an embodiment, the dielectric layers 27, 28 may be comprised of silicon nitride. In an embodiment, the dielectric layers 27, 28 may be comprised of aluminum oxide. In an embodiment, the dielectric layers 27, 28 may be comprised of silicon nitride, and the dielectric layer 34 may be comprised of tetraethylorthosilicate silicon dioxide or fluorinated-tetraethylorthosilicate silicon dioxide. In an embodiment, the dielectric layers 27, 28 may be comprised of aluminum oxide, and the dielectric layer 34 may be comprised of tetraethylorthosilicate silicon dioxide or fluorinated-tetraethylorthosilicate silicon dioxide. In an embodiment, the material constituting the dielectric layers 27, 28 may be characterized by a thermal conductivity in a range of about 20 W/(m*K) to about 300 W/(m*K) and a refractive index in a range of about 1.5 to about 2.5.

In use, the power source 38 is operated to supply a current that causes Joule heating of the silicide layers 31, 32, and heat generated by the silicide layers 31, 32 is transferred to the waveguide core 12 through thermal paths that include the dielectric layers 27, 28. The temperature of the waveguide core 12 is increased by the transferred heat. A temperature gradient exists across the thermal paths with the waveguide core 12 being cooler than the silicide layers 31, 32. The temperature increase experienced by the waveguide core 12 is effective to change the refractive index of the material constituting the waveguide core 12 and to thereby alter the phase of light propagating in the waveguide core 12. In an alternative embodiment, the silicide layer 32 may be absent such that only the silicide layer 31 is present and available to generate heat that is transferred to the waveguide core 12.

The dielectric layers 27, 28 increase the efficiency of heat transfer from the silicide layers 31, 32 to the waveguide core 12 during operation of the thermo-optic phase shifter. The dielectric layers 27, 28 replace portions of the dielectric layer 34 that would conventionally fill the trenches 18, 20. The higher thermal conductivity of the dielectric layers 27, 28, in comparison with the dielectric layer 34, may improve the reliability of the thermo-optic phase shifter because the operating temperature of the silicide layers 31, 32 can be reduced to provide an equivalent temperature at the waveguide core 12. The bandwidth of the thermo-optic phase shifter may be improved by the lowered operating temperature of the silicide layers 31, 32. The reduced operating temperature of the silicide layers 31, 32 may also reduce the power consumption of the thermo-optic phase shifter.

Figure 3:
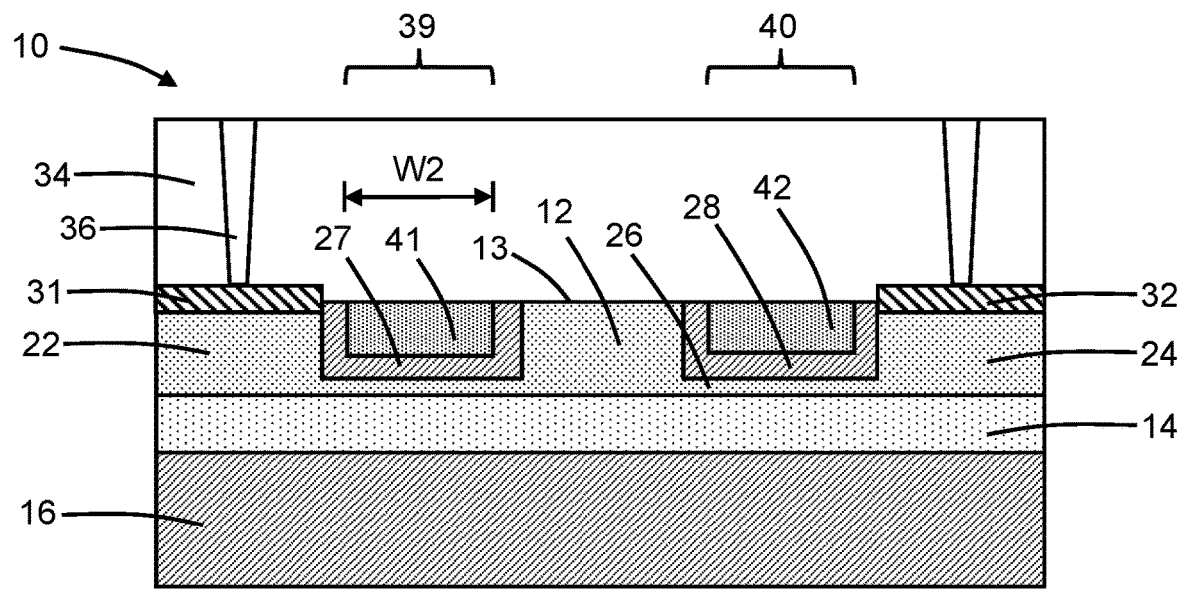
FIG. 3 is a cross-sectional view of a structure in accordance with alternative embodiments of the invention.

With reference to FIG. 3 and in accordance with alternative embodiments, the dielectric layer 27 may include a recess 39, the dielectric layer 28 may include a recess 40, and dielectric layers 41, 42 may be formed inside the recesses 39, 40. The recess 39 in the dielectric layer 27 defines an inner side edge portion adjacent to the waveguide core 12 and an outer side edge portion adjacent to the silicide layer 31. The recess 39 is positioned between the inner and outer side edge portions of the dielectric layer 27. The recess 40 in the dielectric layer 28 defines an inner side edge portion adjacent to the waveguide core 12 and an outer side edge portion adjacent to the silicide layer 32. The recesses 39, 40 and the dielectric layers 41, 42 inside the recesses 39, 40 may each have a width dimension W2 that is less than the width dimension W1 (FIG. 1).

In an embodiment, the outer side edge portion of the dielectric layer 27 may abut the silicide layer 31 in a directly contacting arrangement, and the outer side edge portion of the dielectric layer 28 abut the silicide layer 32 in a directly contacting arrangement. In an embodiment, the respective inner edge portions of the dielectric layers 27, 28 abut the waveguide core 12 in directly contacting arrangements. In an embodiment, the silicide layer 31 may abut a portion of the dielectric layer 27 in a directly contacting arrangement and the dielectric layer 27 may abut the waveguide core 12, and the silicide layer 32 may abut a portion of the dielectric layer 28 in a directly contacting arrangement and the dielectric layer 28 may abut the waveguide core 12.

In an embodiment, the dielectric layers 41, 42 may be comprised of a different material than the dielectric layers 27, 28. In an embodiment, the dielectric layers 41, 42 may be comprised of a material characterized by a lower thermal conductivity than the material of the dielectric layers 27, 28. In an embodiment, the dielectric layers 41, 42 may be comprised of a different material than the dielectric layer 34. In an embodiment, the dielectric layers 41, 42 may be comprised of a material characterized by a higher thermal conductivity than the material of the dielectric layer 34. In an embodiment, the dielectric layers 41, 42 may be comprised of a material characterized by a lower thermal conductivity than the material of the dielectric layers 27, 28 and a higher thermal conductivity than the material of the dielectric layer 34. In an embodiment, the dielectric layers 41, 42 may be comprised of silicon dioxide.

Figure 4:
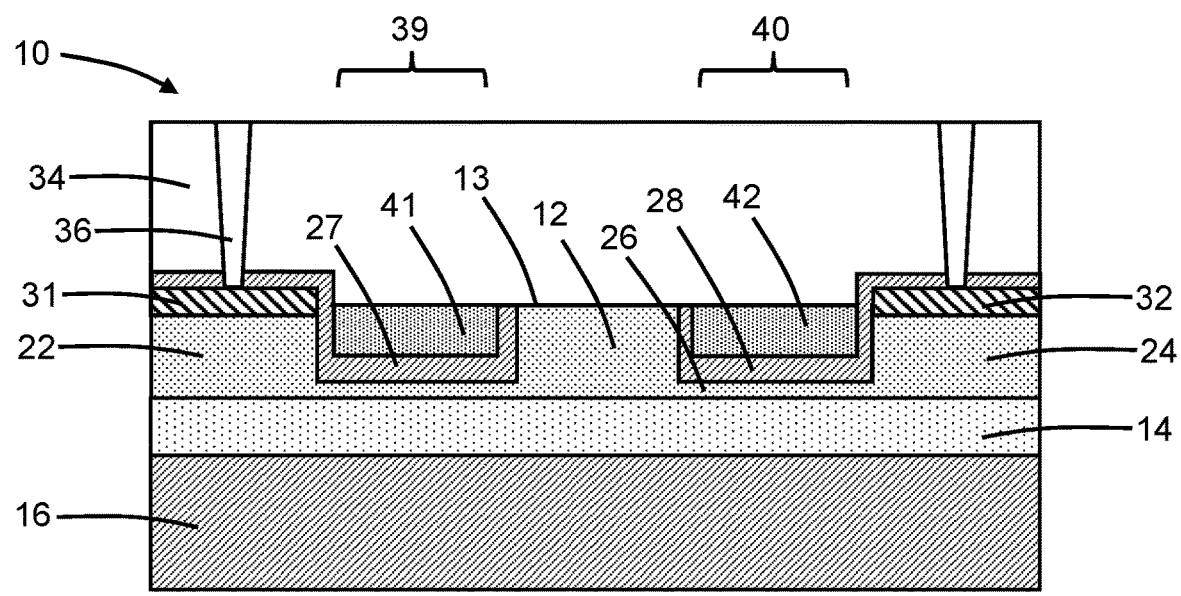
FIG. 4 is a cross-sectional view of a structure in accordance with alternative embodiments of the invention.

With reference to FIG. 4 and in accordance with alternative embodiments, the outer side edge portions of the dielectric layers 27, 28 may be extended outwardly to respectively overlap with the silicide layers 31, 32 as well as abut with the side edges of the silicide layers 31, 32. The silicide layer 31 is positioned in a vertical direction between the overlapping side edge portion of the dielectric layer 27 and the strip 22, and the silicide layer 32 is positioned in a vertical direction between the overlapping side edge portion of the dielectric layer 28 and the strip 24. The overlapping arrangements increase the amount of direct contact between the respective outer side edge portions of the dielectric layers 27, 28 and the silicide layers 31, 32.

Figure 5:
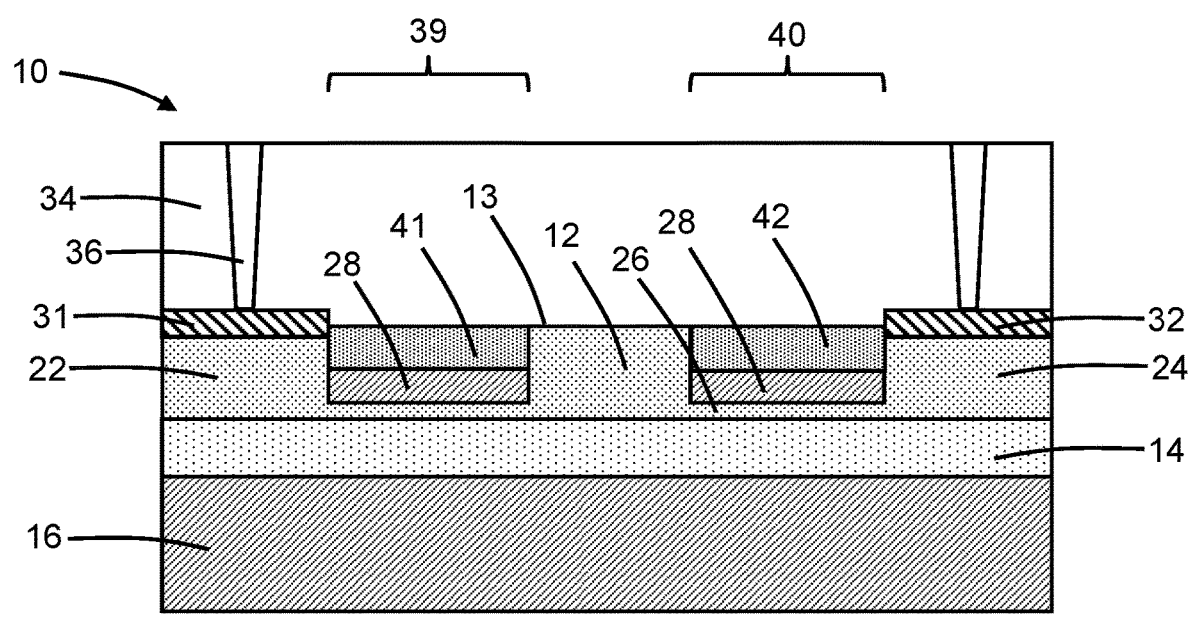
FIG. 5 is a cross-sectional view of a structure in accordance with alternative embodiments of the invention.

With reference to FIG. 5 and in accordance with alternative embodiments, the recesses 39, 40 may be widened to have a width that is equal to the full width W1 of the trenches 18, 20 (FIG. 1), the dielectric layer 41 may fully fill the space inside the trench 18 over the dielectric layers 27, and the dielectric layer 42 may fully fill the space inside the trench 20 over the dielectric layer 28. In an embodiment, the dielectric layers 27, 28 may be positioned fully below the top surface 13 of the waveguide core. In an embodiment, the dielectric layers 27, 28 may have a non-contacting arrangement with the sections of the silicide layer 32. In an embodiment, the dielectric layers 27, 28 may be positioned fully below the top surface 13 of the waveguide core, and the dielectric layers 27, 28 may have a non-contacting arrangement with the sections of the silicide layer 32.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a waveguide structure including a waveguide core;
    a silicide layer;
    a first dielectric layer arranged in a lateral direction between the silicide layer and the waveguide core, the first dielectric layer comprising a first material having a first thermal conductivity; and
    a second dielectric layer positioned over the waveguide core, the silicide layer, and the first dielectric layer, the second dielectric layer comprising a second material having a second thermal conductivity that is less than the first thermal conductivity.

2. The structure of claim 1 wherein the first dielectric layer abuts the silicide layer.

3. The structure of claim 2 wherein the first dielectric layer abuts the waveguide core.

4. The structure of claim 2 wherein the first dielectric layer includes a side edge portion that overlaps with the silicide layer.

5. The structure of claim 1 wherein the first dielectric layer includes a first side edge portion that abuts the silicide layer.

6. The structure of claim 5 wherein the first dielectric layer includes a second side edge portion that abuts the waveguide core.

7. The structure of claim 1 wherein the first dielectric layer and the silicide layer have a non-contacting arrangement.

8. The structure of claim 1 further comprising:
a third dielectric layer positioned between the first dielectric layer and the second dielectric layer.

9. The structure of claim 8 wherein the third dielectric layer comprises a third material having a third thermal conductivity that is greater than the second thermal conductivity.

10. The structure of claim 8 wherein the first dielectric layer includes a recess, and the third dielectric layer is positioned in the recess in the first dielectric layer.

11. The structure of claim 10 wherein the first dielectric layer includes a side edge portion adjacent to the recess, the side edge portion of the first dielectric layer abuts the silicide layer, and the side edge portion of the first dielectric layer is positioned in the lateral direction between the third dielectric layer and the silicide layer.

12. The structure of claim 11 wherein the side edge portion of the first dielectric layer overlaps with the silicide layer.

13. The structure of claim 1 further comprising:
a contact in the second dielectric layer, the contact connected to the silicide layer.

14. The structure of claim 1 wherein the first thermal conductivity of the first material is in a range of about 20 W/(m*K) to about 300 W/(m*K), and the first material has a refractive index in a range of about 1.5 to about 2.5.

15. The structure of claim 1 wherein the waveguide structure includes a slab layer connected to a lower portion of the waveguide core, and the slab layer is thinner than the waveguide core.

16. The structure of claim 15 wherein the waveguide core and the slab layer comprise silicon, and further comprising:
a strip adjacent to the waveguide core, the strip comprising silicon, and the strip connected to the waveguide core by the slab layer.

17. The structure of claim 16 wherein the silicide layer is positioned on the strip, and the first dielectric layer is positioned on the slab layer.

18. The structure of claim 17 wherein the first dielectric layer includes a side edge portion that abuts the silicide layer.

19. The structure of claim 18 wherein the side edge portion of the first dielectric layer overlaps with the silicide layer and the strip.

20. A method comprising:
forming a waveguide structure including a waveguide core;
forming a silicide layer;
forming a first dielectric layer arranged in a lateral direction between the silicide layer and the waveguide core, wherein the first dielectric layer comprises a first material having a first thermal conductivity; and
forming a second dielectric layer positioned over the waveguide core, the silicide layer, and the first dielectric layer, wherein the second dielectric layer comprises a second material having a second thermal conductivity that is less than the first thermal conductivity.

\* \* \* \* \*